United States Patent [19]

Chapman et al.

[11] 3,878,019

[45] Apr. 15, 1975

[54] PROCESS OF PRODUCING SPOT BONDED NON-WOVEN WEBS USING ULTRA-VIOLET RADIATION

[75] Inventors: Charles Brian Chapman; Robert Anthony Haldon, both of Abergavenny, England

[73] Assignee: Imperial Chemical Industries Limited, London, England

[22] Filed: May 16, 1973

[21] Appl. No.: 360,744

Related U.S. Application Data

[63] Continuation of Ser. No. 142,074, May 10, 1971.

[30] Foreign Application Priority Data

May 19, 1970 United Kingdom............... 24212/70

[52] U.S. Cl. ......... 156/272; 117/93.31; 204/159.14; 204/159.19; 204/159.20; 156/291; 161/148; 264/22; 264/128

[51] Int. Cl. ........ B29c 19/02; B01j 1/10; B32b 3/02
[58] Field of Search ...... 156/272, 290, 291; 264/22, 264/128; 204/159.20, 159.19, 159.14; 117/93.31; 161/148

[56] References Cited
UNITED STATES PATENTS

| | | | |
|---|---|---|---|
| 3,322,584 | 5/1967 | Welin-Berger...................... | 161/148 |
| 3,421,501 | 1/1969 | Beightol............................... | 264/22 |
| 3,476,638 | 11/1969 | Paulig et al. ....................... | 161/148 |
| 3,655,483 | 4/1972 | Borrel et al........................ | 156/272 |
| 3,765,974 | 10/1973 | Petersik ............................. | 161/148 |

*Primary Examiner*—Douglas J. Drummond
*Attorney, Agent, or Firm*—Herbert N. Adrian, Jr.

[57] ABSTRACT

A process for bonding non-woven webs by applying a film-forming polymer and subsequently cross-linking said polymer by photochemical means.

13 Claims, No Drawings

PROCESS OF PRODUCING SPOT BONDED NON-WOVEN WEBS USING ULTRA-VIOLET RADIATION

This is a continuation of application Ser. No. 142,074, filed May 10, 1971.

This invention relates to the manufacture of non-woven webs and more particularly to a method of bonding non-woven webs.

Non-woven webs comprising an assembly of fibres or filaments in a loosely associated form have in the past been bonded using various types of polymeric bonding agents applied in a variety of ways with heat and/or pressure. Depending on the nature, amount and distribution of the polymeric bonding agent many of the prior art non-woven fabrics on the one hand are either stiff or papery although possessing relatively good strength or on the other hand have a soft handle and drape but have relatively low strength and are not suitable for many textile applications on this account.

We now provide a method of bonding non-woven webs which does not depend on the use of heat and/or pressure.

According to the present invention we provide a process for producing a bonded non-woven web comprising forming a web of fibrous material, applying to said web a film-forming polymer in the presence of a photosensitive group as defined and then cross-linking said polymer by exposure to actinic radiation.

The present invention also includes bonded non-woven webs made according to the process of the invention.

By a photosensitive group we mean a group capable of absorbing radiation and going to an excited state which can interact with a polymer to produce a polymer radical.

The photosensitive group may form a part of the film-forming polymer structure as, for example, poly (vinyl cinnamate), or it may form part of a separate compound. Examples of compounds containing photosensitive groups are benzophenone, sodium benzoate, 4-chloro-benzophenone, desoxy benzoin, benzaldehyde and benzil.

The non-woven web may be formed by any known conventional techniques such as, for example, by carding staple fibres or by laying down fibres or continuous filaments in a random or regular arrangement on top of each other. The web may be subjected to a needling treatment to obtain greater strength at right angles to the surfaces of the web.

The fibrous material forming the web may comprise synthetic fibres or continuous filaments such as, for example, polyester, polyamide, polyolefin or polyacrylic fibres or natural fibres or may comprise a mixture of fibres.

The film-forming polymers may be vinyl or condensation polymers or copolymers. Examples of suitable film-forming vinyl polymers for use in the present invention are homopolymers and copolymers derived from acrylonitrile, styrene, acrylamide, vinyl acetate, alkyl acrylates and methacrylates, butadiene, acrylic acid, vinyl pyrrolidone, vinyl pyridine, 2-hydroxyethyl acrylate and methacrylate.

The film-forming polymer may be applied to the web by spraying or by immersion techniques. The polymer may be applied from solution or dispersed in a liquid medium. The solvent or continuous phase may be removed if desired by a thermal treatment or may be allowed to evaporate. Where heat is used, it should be insufficient to cause cross-linking of the polymer.

In a preferred embodiment of the invention, cross-linking of the film-forming polymer is carried out at discrete locations over the web such that a discrete bonding effect is obtained. A random or patterned bonding effect may be obtained. The latter effect may be achieved for example by placing a perforated screen between the polymer-coated web and the source of actinic radiation or by focusing a suitable image onto the polymer-treated web.

Alternatively the fabric may be scanned with a point beam of light, using a suitable optical system, for example a rotating mirror, and the intensity of the scanning beam varied according to some desired pattern so that bonding occurs, in the same pattern, only where the light intensity is sufficiently great. Alternatively, the beam of light of continuous uniform intensity may scan the fabric through a perforated screen. The fabric may be forwarded continuously beneath this screen.

In an alternative system the fabric is scanned by a moving light source, for example that produced on a cathode ray tube screen. Random or regular patterns of light may be imaged on the fabric, as determined by the electrical signal fed to the tube.

A diffraction pattern may be produced by for example passing the light beam through a suitable grating, and similarly light patterns may be produced by interference fringes, and by the techniques of holography. Alternatively an image may be projected onto the fabric from an hologram.

Uncross-linked polymer may be removed by any suitable means such as washing or solvent treatment.

The invention is illustrated but not limited by the following examples in which parts and percentages are by weight:

EXAMPLE 1

A 2 oz/yd$^2$ continuous filament nylon web was impregnated with a 12% aqueous emulsion of polyethyl acrylate containing 0.12% benzophenone. The web was squeezed between rollers to give 150–200% wet pick-up and air dried at 60°C. The sample was irradiated with a medium pressure mercury lamp at a distance of 2 inches for 5 minutes. A further sample was similarly treated, but irradiated through a patterned screen which gave a pattern of ultra-violet light on the sample. In this case about 25 spots, each approximately ⅛ inch diameter were patterned per square inch. Polymer not cross-linked with this irradiation, i.e. in the dark areas, was washed off by immersion in acetone.

Both samples were now bonded webs with reasonable tensile and abrasion resistance properties. The patterned web had a lower breaking load than the totally irradiated sample (measured on a 5 × 2 cm sample) but very much higher than an unbonded sample. The flexibility of this patterned web, measured as bending length in cms of a 1 inch sample on a Shirley Stiffness Tester, was much more than the totally irradiated and very similar to the unbonded web. The following results were obtained:

| Web Sample | % PEA on web | Yield Pt.(Kg) | Bending length(cm) |
|---|---|---|---|
| 1. totally cross-linked | 36.8 | 5.8 | 2.9 |

-Continued

| Web Sample | % PEA on web | Yield Pt.(Kg) | Bending length(cm) |
|---|---|---|---|
| 2. cross-linked in spot pattern | 31.5 | 2.4 | 1.9 |
| 3. unbonded | 0 | 0.3 | 1.7 |

EXAMPLE 2

A sample of 2 oz/yd$^2$ nylon web was coated with a solution of polyvinyl cinnamate in toluene/methyl ethyl ketone containing benzophenone (10% by weight on polyvinyl cinnamate) such that approximately 30% polymer was present on the web. Drying took place in vacuum at 50°C in the dark.

One sample was totally irradiated for 5 minutes with a 125 w medium pressure mercury lamp at a distance of 6 cm to effect photodimerisation of the polyvinyl cinnamate. Uncross-linked polyvinyl cinnamate was removed by washing in methyl ethyl ketone.

A second sample was similarly treated except that irradiation took place through a patterned screen (3mm holes, 3/cm$^2$). A third sample was irradiated through another patterned screen (1mm holes, 16/cm$^2$).

The pattern bonded samples were stronger than unbonded web but very much weaker than area bonded. However the area bonded webs (even at low polymer add-on) were quite stiff whereas the spot bonded were flexible.

The following results were obtained:

| Web Sample | Yield Point (Kg) | Bending length (cm) |
|---|---|---|
| totally irradiated | 4.2 | 5.0 |
| pattern irradiated (3 mm holes) | 0.8 | 2.2 |
| pattern irradiated (1 mm holes) | 0.5 | 1.8 |
| unbonded | 0.13 | 1.9 |

EXAMPLE 3

An elastomer was prepared from the following by normal polyesterification methods,

| | |
|---|---|
| polytetrahydrofuran (m. wt. 2010) | 60 parts |
| dimethyl terephthalate | 26.5 parts |
| benzophenone dicarboxylic acid methylester | 4.14 parts |
| ethylene glycol | 28.1 parts |
| t-butyl titanate | 2 drops |

The polymer was yellow-green and had,
I.V. (o-chlorophenol)  0.83
Vicat Softening Point  163°C A 5% solution of this elastomer in chloroform was applied to a 2 oz/yd$^2$ non-woven 6.6 nylon continuous filament web. One sample was irradiated totally for 10 minutes with a medium pressure mercury lamp at a distance of 5 cm. A second sample was irradiated through a patterned screen to give a pattern of spots on the web such that each spot was 3 mm in diameter, there being ~3 spots per cm$^2$. A third sample was similarly irradiated through another patterned screen to give spots 1 mm in diameter, 16 per cm$^2$. Uncross-linked polymer was removed by extraction with chloroform.

All three webs were stronger and had more resistance to abrasion than a non-bonded web but while the totally irradiated fabric was quite stiff, those with the pattern of bonded areas were much more flexible. The following results were obtained:

| Web Sample | % on web | Yield Point (Kg) | Bending length (cm) |
|---|---|---|---|
| totally irradiated | 8 | 1.2 | 3.1 |
| with holes 3mm diameter (3/cm$^2$) | 6 | 0.7 | 2.2 |
| with hole 1mm diam. (16/cm$^2$) | 8 | 1.2 | 1.8 |
| unbonded | 0 | 0.3 | 1.7 |

EXAMPLE 4

An unsaturated polyetherester elastomer was prepared from the following starting materials

| | |
|---|---|
| polytetrahydrofuran | 60 parts |
| diethyl maleate | 7.5 parts |
| dimethyl terephthalate | 23.0 parts |
| ethylene glycol | 27.0 parts |
| t-butyl titanate | 2 drops |

Polyesterification was carried out in the normal way. A lemon coloured elastomer resulted with I.V. (o-chlorophenol) 0.80

Vicat Softening Point 238°C

A 10% solution of the above polymer in chloroform was applied to 3 samples of a 2 oz/yd$^2$ unbonded non-woven 6.6 nylon web. One sample was irradiated all over one side for 10 minutes while the other two were irradiated through large hole metal screens (3mm holes, on average 3 per sq cm and 1 mm holes, on average 16 per sq cm respectively) for 10 minutes followed by extraction of the uncross-linked polymer. All three same fabrics with improved tensile strength and abrasion resistance over the non-bonded webs. The relevant results below show that the point bonded webs were much more flexible than the area bonded although less strong.

| Web Sample | % on web | Yield Pt. (Kg) | Bending length(cm) |
|---|---|---|---|
| totally irradiated | 14 | 2.0 | 3.2 |
| spot patterned (3 mm holes;3 per sq cm) | 4.2 | 1.1 | 1.8 |
| spot patterned (1 mm holes, ~16 per sq cm) | 2.2 | 1.0 | 1.6 |
| unbonded | 0 | 0.3 | 1.7 |

We claim:

1. A process for producing a bonded non-woven flexible web comprising:
   a. forming a non-woven web of fibrous material,
   b. applying on the web a coating of a film-forming polymer containing a photosensitive group therein or adding thereto a compound containing photosensitive groups,
   c. subjecting discrete locations of the film-forming polymer coated web to ultra-violet radiation for a period of time sufficient to cause cross-polymerization of the film-forming polymer at the discrete locations to thereby effect polymer bonding of the web at these locations, d. removing unpolymerized polymer from the web thereby forming a flexible web having a bending length as measured by a Shirley Stiffness Tester less than a fully bonded web.

2. A process as in claim 1 wherein the non-woven web is constructed of fibres of material selected from the group consisting of natural organic material and synthetic organic material.

3. A process according to claim 1 wherein the web is a nylon web and the film-forming polymers are selected from the group consisting of homo- and copolymers derived from acrylonitrile, styrene, acrylamide, vinyl acetate alkyl acrylates and methacrylates, butadiene, acrylic acid, vinyl pyrrolidone, vinyl pyridine, polyethyl acrylate 2-hydroxyethyl acrylate and methacrylate, polyvinyl cinnamate and polyester elastomers and mixtures thereof and the photosensitive compounds are selected from the group consisting of benzophenone, sodium benzoate, 4-chloro-benzophenone, desoxy benzoin, benzaldehyde and benzil.

4. A process of claim 3 wherein the film-forming polymer is polyethyl acrylate and the photosensitisor is benzophenone.

5. A process of claim 3 wherein the film-forming polymer is polyvinyl cinnamate and the photosensitisor is benzophenone.

6. A non-woven polymer bonded flexible web prepared by the process of claim 1.

7. A process according to claim 1 in which the non-woven web contains staple fibres.

8. A process according to claim 1 in which the non-woven web contains continuous filaments.

9. A process according to claim 1 in which the non-woven web has been subjected to a needling treatment.

10. A process according to claim 1 in which the photosensitive group forms a part of the structure of the film-forming polymer.

11. A process according to claim 1 in which the photosensitive group forms a part of a separate compound.

12. A process according to claim 1 in which the coating is applied to the web by a spraying technique.

13. A process according to claim 1 in which the coating is applied to the web by an immersion technique.

* * * * *